United States Patent [19]
Lindberg

[11] 4,140,090
[45] Feb. 20, 1979

[54] PRECOMBUSTION CHAMBER, STRATIFIED CHARGE INTERNAL COMBUSTION ENGINE SYSTEM USING A HIGHLY COMBUSTIBLE GAS IN THE PRECOMBUSTION CHAMBER

[75] Inventor: John E. Lindberg, Berkeley, Calif.

[73] Assignee: Owen, Wickersham & Erickson, San Francisco, Calif.

[21] Appl. No.: 623,482

[22] Filed: Oct. 17, 1975

[51] Int. Cl.$^2$ .................... F02B 75/02; F02B 33/00
[52] U.S. Cl. .................... 123/75 B; 123/1 A; 123/3; 123/32 ST; 123/119 EE; 123/191 SP; 123/DIG. 12
[58] Field of Search .......... 123/1 A, 3, 32 K, 32 SP, 123/32 ST, 75 B, 119 E, 121, 127, 191 S, 191 SP, DIG. 12, 119 EE; 204/230, 129

[56] References Cited

U.S. PATENT DOCUMENTS

| | | | |
|---|---|---|---|
| 1,181,122 | 5/1916 | Eastman | 123/32 SP |
| 1,380,183 | 5/1921 | Boisen | 204/230 |
| 1,422,794 | 7/1922 | Smith | 123/32 SP |
| 1,957,541 | 5/1934 | Johnson | 123/32 SP |
| 2,238,852 | 4/1941 | Regar | 123/191 SP |
| 2,384,463 | 11/1945 | Gunn | 123/DIG. 12 |
| 2,617,841 | 11/1952 | Linder | 123/148 E |
| 3,406,667 | 10/1968 | Evans et al. | 123/32 SP |
| 3,433,729 | 3/1969 | Proskuryahov et al. | 204/129 |
| 3,784,096 | 1/1974 | Zweifel | 204/230 |
| 3,939,806 | 2/1976 | Bradley | 123/DIG. 12 |
| 3,955,538 | 5/1976 | Noguchi et al. | 123/3 |
| 3,970,054 | 7/1976 | Henault et al. | 123/32 ST |

Primary Examiner—Ronald H. Lazarus
Assistant Examiner—David D. Reynolds
Attorney, Agent, or Firm—Owen, Wickersham & Erickson

[57] ABSTRACT

A gaseous fuel is used in a precombustion chamber for igniting lean fuel-oxidant mixtures in a main combustion chamber of an internal combustion engine.

The precombustion chamber preferably utilizes a highly combustible gaseous fuel which burns clean with little or no deposits and produces no pollutants.

The combustion gas products from the precombustion chamber are injected into the main combustion chamber at high temperature and at high velocity to produce highly efficient turbulent mixing of a lean fuel-oxidant mixture in the main combustion chamber and to produce effective ignition and efficient burning of the fuel at the lean fuel-oxidant ratios in the main combustion chamber for increased engine efficiency and lowered emissions as compared to existing engine systems using conventional spark ignition.

The precombustion chamber mechanism incorporates injection structure for producing standing waves in the main combustion chamber to provide a plurality of highly effective ignition points.

In preferred forms of the present invention hydrogen is utilized as the gaseous fuel for the precombustion chamber to provide absolutely clean combustion.

An electrolytic generator can be incorporated with the precombustion chamber mechanism for generating hydrogen and oxygen gases to operate the precombustion chamber. The electrolytic generator includes an automatic water feed system for replacing the water used to generate the hydrogen and oxygen gases and incorporates an electrode and internal pressurization arrangement for automatically shutting off the generation of hydrogen and oxygen gases on engine shut-down and for storing a sufficient quantity of hydrogen and oxygen gases to facilitate subsequent engine start-up.

23 Claims, 5 Drawing Figures

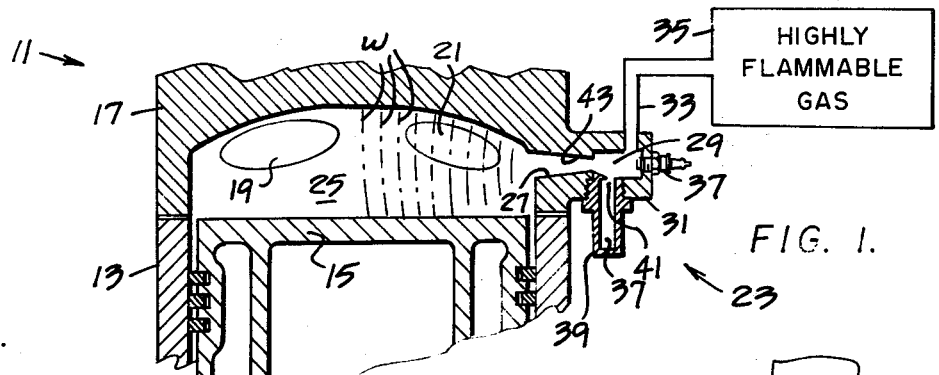
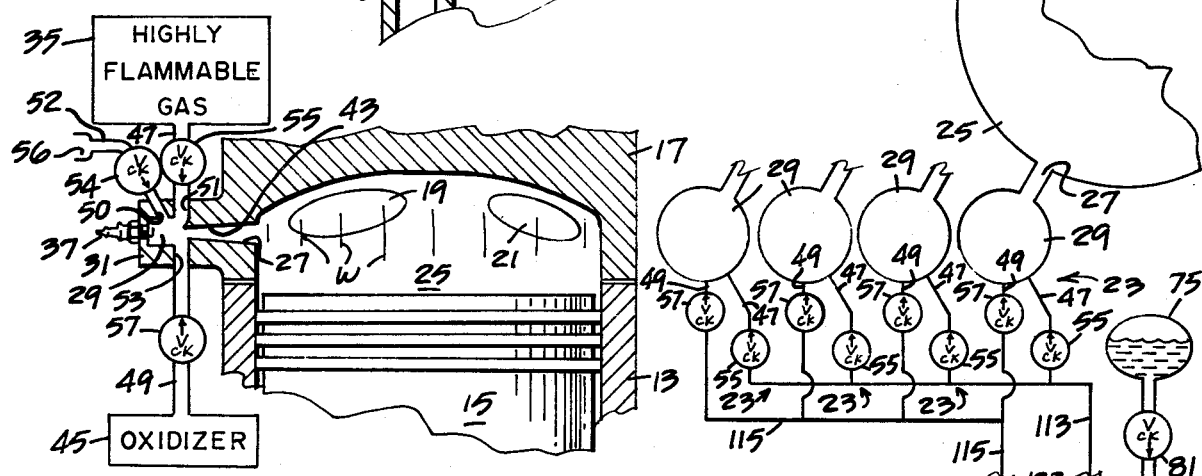
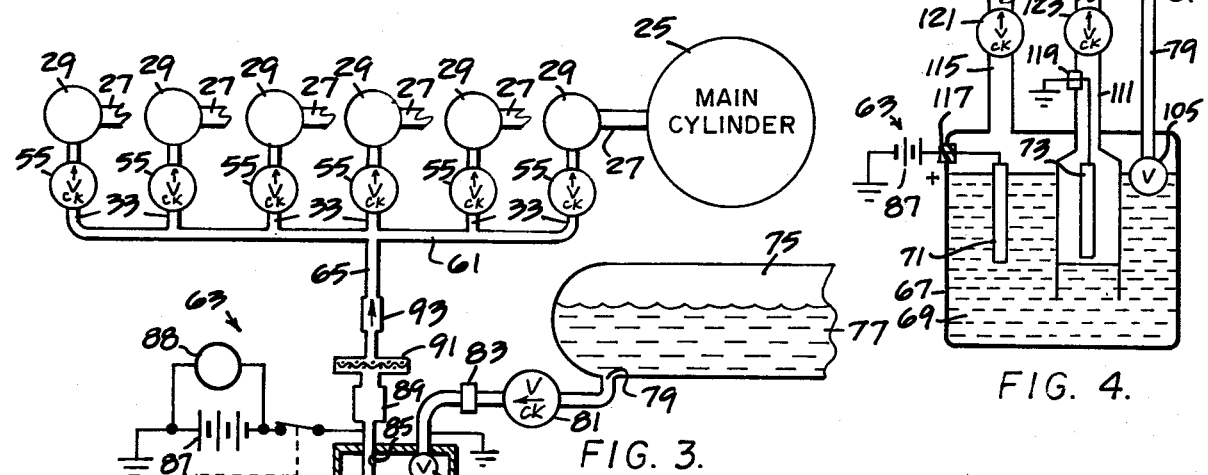
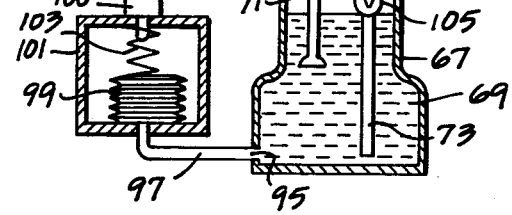
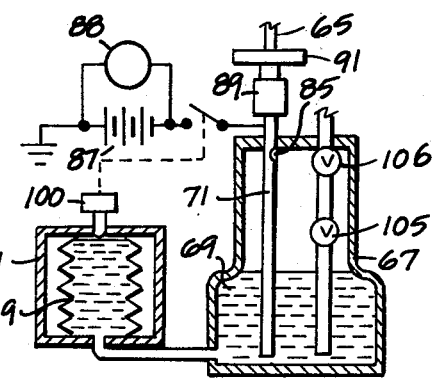
FIG. 1.
FIG. 2.
FIG. 4.
FIG. 3.
FIG. 3A.

PRECOMBUSTION CHAMBER, STRATIFIED CHARGE INTERNAL COMBUSTION ENGINE SYSTEM USING A HIGHLY COMBUSTIBLE GAS IN THE PRECOMBUSTION CHAMBER

BACKGROUND OF THE INVENTION

Conventional ignition systems for internal combustion engines incorporate spark plugs located in the combustion chamber for igniting a mixture of a vaporized hydrocarbon fuel and air.

Such conventional ignition systems present a number of problems.

Because the ignition is dependent upon the spark produced by the electrodes of the spark plug, the spark itself must have a relatively high intensity of energy and must be located within the combustion chamber to initiate and to distribute the ignition throughout the combustion chamber in a way that will insure complete combustion and the required distribution of the flame front in advance of any auto ignition which might occur by localized compression or hot spots within the combustion chamber structure. Because a high intensity, high energy, high temperature spark is required, the size of the plug must be physically large; and the related electrical circuitry must have sufficient capacity for producing the high intensity spark.

The exhaust gas emissions produced by conventional internal combustion engines utilizing such spark ignition systems as described above are hard to maintain within acceptable limits, and the overall combustion efficiency and the resulting fuel economy are relatively poor.

A number of precombustion chamber systems have been proposed for producing so-called stratified charges in attempts to improve the overall combustion process, but one major drawback of most of these precombustion chamber systems has been the fact that they have relied on conventional hydrocarbon fuels for their operation. Such hydrocarbon fuels require carburetion or other control of the mixing of the fuel with the air or other oxidant within relatively narrow ranges because the combustibility range of such hydrocarbon fuels falls within a narrow band.

The use of conventional hydrocarbons fuels for precombustion chambers also produces the same problems of deposits and emissions that occur within the main combustion chamber. Thus, carbon and lead deposits on the precombustion chamber surface occur, and nitrous oxide can be formed, and unburned hydrocarbons can also be produced, because a relatively rich mixture is usually burned in the precombustion chamber to insure ignition. When relatively rich hydrocarbon fuels are used in the precombustion chamber, unburned hydrocarbons may exist in the engine exhaust even though the fuel-air mixture in the main combustion chamber is maintained relatively lean.

Because deposits are produced in precombustion chambers using hydrocarbon fuels, the precombustion chamber mechanisms themselves have been required to be relatively large. The minimum spark plug structure had to be large enough to accomodate the build-up of such deposits and still produce an effective spark. Furthermore, the precombustion chamber systems using conventional hydrocarbon fuels have required valve structure for controlling the introduction of the fuel-air mixture into the precombustion chamber, and such valve structure has conventionally taken the form of a relatively complex and bulky poppet valve arrangement which must be timed in coordination with other engine structure to control the inlet of the mixture into the precombustion chamber. The precombustion chamber systems using hydrocarbon fuels have also usually required their own carburetor, or metered fuel injection mechanism, for providing the required control over the mixture of the hydrocarbon fuel with air.

All of these features of precombustion chamber systems using hydrocarbon fuels have limited the use of such precombustion chamber systems because of the resulting complexity, size and expense of installing such systems on internal combustion engines.

In attempts to provide cleaner combustion in internal combustion engines, it has been proposed to utilize hydrogen as a fuel. Systems have therefore been proposed in which hydrogen is fed into a main combustion chamber and burned with either air or oxygen. While hydrogen is a very desirable fuel because of its clean burning characteristics, it has been impractical, to date, to use hydrogen as an internal combustion engine fuel, in place of hydrocarbon fuel, because of the cost of producing the hydrogen and the difficulty of obtaining, storing and transporting hydrogen in sufficient quantities to use as the main fuel.

It is an important object of the present invention to overcome the drawbacks of the prior art by using a highly combustible gas in a precombustion chamber which is combined with a main combustion chamber using a hydrocarbon fuel.

SUMMARY OF THE INVENTION

The present invention uses a gaseous fuel in a precombustion chamber for igniting a lean fuel-oxidant mixture in a main combustion chamber.

In preferred embodiments the gaseous fuel is a highly combustible gaseous fuel and the gaseous fuel is fed into a quite small precombustion chamber structure where it is ignited by an igniter plug which can operate at low energy levels and low temperatures and with quite small electrode surfaces because of the ease with which the highly combustible gas can be ignited.

The use of a highly combustible gas as the fuel for the precombustion chamber has a number of benefits.

Because the fuel is in a gaseous form, it does not have to be vaporized from a liquid state with the resulting problem of producing the desired degree of vaporization. Since the gaseous fuel is a highly combustible gaseous fuel, the gas can be ignited over a wide range of mixtures with an oxygen containing gas, and ignition can be accomplished by simplified structure of small size operating at low energy levels.

The highly combustible gas used as a fuel for the precombustion chamber burns at high temperature levels to produce high temperature ignition for the hydrocarbon fuel in the main combustion chamber.

The precombustion chamber mechanism is connected to the main combustion chamber by a nozzle having an orifice of critical size and location to produce flow at sonic velocity and standing waves in the main combustion chamber, and this high velocity, standing wave type of flow maximizes the turbulent mixing and number of ignition points in the main combustion chamber. The standing wave phenomena is in itself an important feature because of the temperature differential between the node and anti-node of the standing wave and the resulting increase of efficiency of points of ignition. That is, the temperatures are maximized along lines produced by the standing waves, rather than being distributed more or less uniformly across the entire volume of the main combustion chamber, and this permits much higher temperatures to produce a large number of high temperature ignition points spaced throughout the main combustion chamber.

A separate resonant chamber is also associated with the precombustion chamber mechanism in one embodiment of the present invention for maximizing the ultrasonic injection of the combustion gases from the precombustion chamber into the main combustion chamber.

In preferred embodiments of the present invention separate conduits are provided for conducting the highly combustible gaseous fuel and the oxidizer to the precombustion chamber so that these two gases are first mixed in the precombustion chamber itself to maximize the safety of operation of the present invention.

The present invention also incorporates a highly efficient electrolytic gas generator for converting stored water to hydrogen and oxygen gases with high electrical efficiency and relatively insignificant use of a liquid electrolyte. In this embodiment of the invention potassium hydroxide or sodium hydroxide is preferably used as the electrolyte and is used in an enclosed container to which water is automatically fed as needed for conversion to hydrogen and oxygen gases.

The generation of oxygen and hydrogen is automatically discontinued on engine shut-down by an electrode arrangement incorporated in the electrolytic generator in some forms of the present invention. In this arrangement, the pressure of the generated gas is used to depress the level of the liquid electrolyte solution below and out of contact with, one electrode after engine shut-down so that no more gas is generated until the engine is again started.

All embodiments of the present invention incorporate a safety arrangement for utilizing a highly combustible gas, such as hydrogen, in a way which assures safety of operation.

Internal combustion engine apparatus and methods which incorporate the features noted above and which are effective to produce the results described above constitute further, specific objects of the present invention.

Other and furthur objects of the present invention will be apparent from the following description and claims and are illustrated in the accompanying drawings which, by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWINGS

FIG. 1 is a side elevation view, in cross section, through the top part of a combustion chamber of an engine constructed in accordance with one embodiment of the present invention. In FIG. 1 a precombustion chamber using a highly combustible gas is constructed to have a resonance chamber for producing ultrasonic injection of the products of combustion of the precombustion chamber into the main combustion chamber.

FIG. 2 is a side elevation view, in cross section, like FIG. 1 but showing another embodiment of an engine constructed in accordance with the present invention. In the FIG. 2 embodiment the fuel and oxidizer for the precombustion chamber are introduced separately into the precombustion chamber and the precombustion chamber has a configuration for producing a velocity of injection which corresponds to the critical velocity of sound to create standing waves and increased efficiency of ignition and burning in the main combustion chamber.

FIG. 3 is a side elevation view showing a system for generating a hydrogen-oxygen gas mixture by electrolysis in accordance with another embodiment of the present invention. In FIG. 3 the hydrogen and oxygen are conducted to the precombustion chambers by a common manifold.

FIG. 3A is a fragmentary side elevation view showing the generator of FIG. 3 in a condition of operation in which the electrolytic gas generating process has been stopped by using the pressure of the generated gases to force the liquid level of the electrolyte down far enough to actuate a switch which opens the circuit.

FIG. 4 is a side elevation view of an electrolytic generating system for generating hydrogen and oxygen separately and for conducting the hydrogen gas to the precombustion chambers separate from the oxygen gas.

DESCRIPTION OF THE PREFERRED EMBODIMENTS

An engine constructed in accordance with one embodiment of the present invention is indicated generally by the reference numeral 11 in FIG. 1.

The engine 11 includes a cylinder 13, a piston 15, a cylinder head 17 (which may have one or more intake and exhaust ports 19 and 21) and precombustion chamber means 23 for igniting a gaseous fuel (preferably a highly combustible gaseous fuel) in the precombustion chamber and then injecting the hot precombustion chamber gases into a main combustion chamber 25 through a port 27.

The main combustion chamber 25 burns a relatively lean fuel-oxident mixture. For example, a conventional hydrocarbon fuel (such as gasoline) and air mixture can be used. The mixture is conducted into the main combustion chamber through the intake valve 19.

In accordance with the present invention the precombustion chamber means 23 comprise a precombustion chamber 29 formed within a housing 31.

A gaseous fuel, such as free hydrogen, carbon monoxide, butane, propane, methane, or ethane or the like is supplied to the precombustion chamber 29 through a conduit 33 from a reservoir or generator 35.

In the precombustion chamber 29 the gaseous fuel is ignited by a spark plug 37, or glow plug or other ignition means.

Because, in the preferred form of the FIG. 1 embodiment, a highly combustible gas is used which has a very broad range of combustibility, it is not necessary to provide carburetion for mixing the highly combustible gas with oxygen, air or another gas containing oxygen. Instead, in the FIG. 1 embodiment, enough air is supplied to the precombustion chamber 29 (by back flow through the port 27 during the intake stroke) to provide the necessary ignition and burning of the combustible gas supplied to the precombustion chamber 29 through the conduit 33. In other embodiments a separate source of oxygen, air or other oxidant is supplied to the precombustion chamber 29 and gaseous fuels which are not highly combustible, such as butane, propane and methane may be used, as will become more apparent from the description to follow.

To illustrate the broad range of combustibility for free hydrogen, for example, the ignition by percent of volume for hydrogen in air varies from 4% at the lower limit to 74.2% at the upper limit.

The ignition limit by percent of volume for carbon monoxide in air varies from 12.5% at the lower limit to 74.2% at the upper limit.

By comparison, the ignition limits for most conventional hydrocarbon fuels fall within a very narrow range.

Benzol (one of the components of gasoline) for example, has an ignition limit by percent of volume in air of 1.41% at the lower limit and 6.75% at the upper limit.

Ethane has ignition limits by percent of volume of 3.22% at the lower limit and 12.45% at the upper limit.

Therefore, normal hydrocarbon fuels must be carbureted very carefully to provide the proper ratios by volume with air in order to obtain ignition.

Moreover, the comparisons noted immediately above for hydrocarbon fuel components are actually vapor comparisons which assume that the fuels have been completely vaporized. In actual practice, complete vaporization of such liquid fuels does not occur so that only partial vaporization is obtained, and the ignition levels are even more narrow than listed immediately above.

Because the fuel used for the precombustion chamber 29 is preferably a highly combustible fuel and is a gaseous fuel, rather than a vaporized liquid fuel, the highly combustible gaseous fuel ignites easily and within a broad range of combustibility within the precombustion chamber 29.

Only very small amounts of fuel are required for the precombustion chamber 29 since the primary purpose of the precombustion chamber is to provide ignition and mixing of the hydrocarbon fuel in the main combustion chamber 25. Because the gaseous fuel burned in the precombustion chamber 29 need not be supplied in an amount to provide any significant power output to the piston 15, only relatively small amounts of gaseous fuel are required; and, accordingly the generation or storing of the highly combustible gas and the structural size of the precombustion chamber mechanism 23 can be kept to a minimum. By way of example, in a specific embodiment of the invention, the precombustion chamber 29 is approximately 0.2 inch in internal diameter and about 0.2 inch in internal length to provide an internal volume of about 0.006 cubic inches. This can of course be smaller or larger.

The highly combustible gas burned in the precombustion chamber 29 produces very high flame temperatures. For example, when free hydrogen is used, the flame temperature generated is approximately 2,045° C. when the atmospheric air is used as the oxidant and is even higher, ranging up to approximately 2,487° C. when the oxidant contains 67% oxygen and ranges up to 2,660° C. when the oxygen content of the mixed fuel and oxygen gases is 78% by volume of oxygen.

Free hydrogen produces the highest flame temperatures, but high flame temperatures can also be obtained by other highly combustible gases, such as carbon monoxide, propane, butane and the like.

Carbon monoxide, for example, produces flame temperatures of 2,100° C. when the percent of carbon monoxide to air is 32%, and carbon monoxide produces a flame temperature of 2,925° C. when the percent of oxygen by volume in a carbon monoxide-oxygen mixture is 70%.

By comparison, conventional hydrocarbon fuels produce significantly lower flame temperatures. For example, gasoline, when burned in air at substantially atmospheric pressure and in the usual fuel-air mixture ratios occuring at engine idle operation, produces a flame temperature of about 1,400° C.

The fact that the highly combustible gases burned in the precombustion chamber 29 produce very high flame temperatures is another factor that permits the amount of gas used in the precombustion chamber 29 and the size of the precombustion chamber mechanism to be minimized.

The hot combustion products from the precombustion chamber 29 flow through the port 27 into the main combustion chamber 25 at high velocity as well as at high temperature, and this produces a desired swirling and aids in turbulent mixing and helps complete vaporization of any liquid fuel droplets introduced into the main combustion chamber 25 through the intake valve 19. As a result, the ignition and burning of the hydrocarbon fuel in the main combustion chamber 25 is accomplished more efficiently and more completely than in a conventional engine system without the precombustion chamber of the present invention.

As a result, the engine can be operated on a leaner fuel-air mixture in the main combustion chamber 25 and this in turn produces more efficiency in operation and less pollutants. Thus, because you have an excess of air, you get less carbon monoxide because the combustion is complete, and you get more complete combustion and therefore very low amounts of unburned hydrocarbons. Also, the flame temperature is cooler, because you have an excess of air which is acting as an internal coolant. Therefore, the formation of nitrous oxide is prevented or maintained very low (since the nitrous oxide is a temperature phenomena relating to combustion chamber temperatures such that higher combustion chamber temperatures tend to produce higher amounts of nitrous oxide).

The precombustion chamber mechanism 23 of the present invention not only provides easy ignition over a broad range of combustibility with the gaseous fuels used in the present invention, but also produces clean combustion with little or no deposits or undesirable emissions. For example, when hydrogen is used as a gaseous fuel, the burning of the hydrogen with oxygen produces only water, and there are absolutely no deposits which can collect on the spark plug 37 or precombustion chamber surfaces. Similarly, when carbon monoxide, ethyleneoxide, carbon disulfide, hydrogen sulfide, diethyle ether, divinyl ether, acetylene and the like are used as the gaseous fuels for the precombustion chamber mechanism 23, the broad range of combustibility provided by such gaseous, highly combustible fuels minimize the formation of undesirable emissions and any deposits on the precombustion chamber surfaces.

In accordance with the present invention, a resonating chamber 37 is preferably incorporated in the precombustion chamber means 23 for producing standing waves W in the main combustion chamber 25. Each wave front W of a standing wave produces a region of high flame front temperatures which serve, in effect, as a plurality of highly effective ignition points in the main combustion chamber 25. The resonance and standing wave pattern also produces increased turbulence for producing the desired mixing in the main combustion chamber 25. The resonance chamber 37 in the FIG. 1 embodiment is produced by structure which in effect forms a whistle. The structure includes a housing 39 which defines the internal chamber 37 for the desired wave length, and the inlet to the chamber 37 is provided by an orifice 41 formed in the upper end of the chamber.

The outlet end of the precombustion chamber 29 is preferably formed in the shape of a nozzle 43 having an orifice at the throat of the nozzle for maximizing the velocity of the precombustion chamber combustion gases ejected into the main combustion chamber 25.

Because the size of the precombustion chamber means 23 can be kept to a minimum small size, the spark plug 37 itself can be maintained quite small.

The spark plug 37 in the present invention can be made quite small because of the cleanliness of combustion in the precombustion chamber structure. With all of the gaseous fuels of the present invention, there are little or no carbon and no lead deposits, and when hydrogen is used there is absolute cleanliness with absolutely no carbon or lead deposits.

There is no lead deposit with any of the gaseous fuels of the present invention because no lead is required for the combustion process in the precombustion chamber 29.

Because of the cleanliness of the combustion reaction within the precombustion chamber 29, there are no deposits which can become glowing hot spots to create problems of preignition. As a consequence, then, smaller precombustion chamber structure and spark plugs can be used and lower energy ignition systems can be used. This is an important advantage because the physical size of the electrodes of the spark plug can be maintained at a minimum with small electrodes.

Because, in the present invention the combustion is so clean, the length of the shunt path can be minimized (that is, virtually no deposits can build up on the shunt path on the ceramic, so a relatively short shunt path can be utilized), and much lower voltages and energies can be used than the voltages and energies required for conventional large spark plugs firing normal hydrocarbon mixtures and having long shunt paths. The extremely small spark plug of the present invention then operates, in conjunction with the highly combustible gaseous fuel and oxidizer in the precombustion chamber, as a highly efficient ignition amplifier (amplifying both temperature and energy) and projection. The present invention amplifies the ignition effect of the spark plug and projects this ignition effect into the main combustion chamber 19 as an amplified effect at many points. The amplified ignition effect is projected and distributed throughout the main combustion chamber by reason of the very high flame front temperatures, the high velocity at which the gases from the precombustion chamber are injected into the main combustion chamber 25 and the standing wave effect produced by the ultrasonic generator.

The system of the present invention provides a significant increase in the ignition energy supplied to the main combustion chamber. One embodiment of the present invention supplies over one hundred times as much ignition energy as the conventional, existing spark ignition systems currently in use. Furthermore, the actual electrical energy required for the spark plug of the present invention is much less than that required for a spark plug of a conventional ignition system.

With the present invention a low temperature electrode plug 37 can be used because very little or no deposits are formed in the precombustion chamber 29. In combustion chambers which burn conventional hydrocarbon fuels deposits are formed on the spark plug surfaces as a normal result of the combustion process and the plug must therefore be a high temperature plug to burn off these deposits. Since in the present invention deposits are not formed, high plug temperatures are not required to burn off deposits and a low temperature plug can be used. Using a low temperature plug helps to prevent preignition, and this is an important factor in the use of highly combustible gases.

In the present invention, it is possible to use existing, conventional voltages and yet obtain longer electrode life because there is less transfer of material from the plug electrodes at the lower temperatures used for the plug in the present invention.

The FIG. 2 embodiment is similar to the FIG. 1 embodiment described above (and corresponding reference numerals have been used for corresponding structural features), but the FIG. 2 embodiment incorporates a reservoir or generator 45 for the oxidizer.

In the FIG. 2 embodiment the gaseous fuel is conducted to the prechamber 29 by a conduit 47 and the oxidizer, such as oxygen gas, is conducted to the precombustion chamber 29 through a conduit 49. A separate port 51 is formed in the wall structure of the precombustion chamber housing 31 for introducing the gaseous fuel, and a separate port 53 is provided for the oxidizer so that the fuel and oxidizer are first mixed together within the precombustion chamber 29 itself.

The conduit 47 has a check valve 55 for preventing any reverse flow of gas or combustion products from the precombustion chamber 29 through the conduit 47, and the conduit 49 has a similar check valve 57 for preventing reverse flow through the conduit 49.

The nozzle 43 is preferably made to the configuration of a critical flow nozzle, and the chamber 29 itself has a configuration producing resonance so that the nozzle produces the standing waves W in the main combustion chamber 25 as described above with reference to FIG. 1.

Because the flame temperatures are quite high in the precombustion chamber 29, the heat soak into the structure of the housing 31 can build up to the point where internal air cooling is desirable in some cases.

In the FIG. 2 embodiment a passageway 50 extends through the wall of the housing 31 and connects to a conduit 52 which opens to atmosphere. A one-way check valve 54 permits flow from atmosphere to the passageway 50.

An orifice 56 at the inlet end of the conduit 52 regulates the amount of flow into and through the conduit 52.

The orifice 56, conduit 52, check valve 54 and passageway 50 permit a regulated flow of cooling air to the precombustion chamber 29 on the intake stroke of the piston 15 to provide internal air cooling of the precombustion chamber internal surfaces, which can become critical in cases where free hydrogen is burned with oxygen under vacuum conditions, since under these conditions the ignition temperature can be as low as 400° C. at 10mm Mercury. This is a condition where preignition can occur if an undesirable amount of heat soak is permitted to accumulate as a result of the extremely high flame front temperatures generated in the small precombustion chamber structure. Adding atmospheric air as a dilutant in these conditions of operation is beneficial in that the temperature of self ignition of the hydrogen-oxygen air mixture is raised, so that preignition problems become less critical; and the cooling air inducted thus not only serves to internally air cool the structure, but raises the self ignition temperature of this particular mix of gases over that which would exist without the cooling air. The self ignition temperature is raised in a substantial amount, in the range of several hundred degrees Centigrade.

FIGS. 3, 3A and 4 show other embodiments of the present invention in which a precombustion chamber mechanism 23 is associated with each main cylinder 25 in the same general way as shown in detail above in FIGS. 1 and 2; and FIGS. 3 and 4 illustrate details of specific electrolytic generator systems for generating hydrogen and oxygen for the individual precombustion chamber mechanisms 23.

In the FIG. 3 and FIG. 3A embodiments, the hydrogen and oxygen are supplied to each inlet conduit 33 by a common manifold 61. The inlet manifold 61 is in turn connected to an electrolytic generator 63 by a conduit 65. The electrolytic generator 63 includes an enclosed container 67. The enclosed container 67 is partially filled with a liquid 69. A first electrode 71 and a second electrode 73 extend downward from the upper end of the container into the liquid 69 in the mode of operation illustrated in FIG. 3. Each electrode is a hollow pipe which also serves as a conduit.

A water storage tank 75 is partially filled with water 77 subjected to atmospheric pressure on the upper surface of the water. An outlet 79 in the lower part of the storage tank 75 is connected to the conduit electrode 73 and contain a one-way check valve 81. The conduit electrode 73 is connected to ground as illustrated and may also preferably include an electrical isolator 83.

The conduit electrode 71 is formed with an opening 85 within the enclosed container 67 near the top inside surface of the container for conducting gas generated within the container above the surface of the liquid 69 through the opening 85 and to the conduit 65.

The electrode conduit 71 is connected to a battery 87 and an electrical isolator 89 is located on the conduit beyond the connection to the battery.

A flame retardant screen 91 is interposed in the conduit 65 to prevent any flashback into the gases generated in the enclosed container 67. Flashback can also be prevented by proper dimensioning of the conduit and choice of materials. Highly heat conductive materials and high surface areas with small diameter opening (parallel tubes if necessary) prevent flashback.

A one way check valve 93 is also preferably located in the conduit 65 to prevent any reverse flow of gases.

The lower end of the enclosed container 67 has an opening 95 which connects to a conduit 97, and the conduit 97 is in turn connected to the interior of a bellows 99. The bellows 99 is mounted within a housing 101, and a biasing spring 103 exerts a biasing force on the bellows 99 in a direction which tends to force the contents of the bellows 99 back into the interior of the enclosed container 67. The bellows 99 thus serves as a flexible walled, spring biased accumulator for accumulating a certain amount of liquid flow from the enclosed container 67 (as illustrated in FIG. 3A) to permit the level of the liquid 69 to drop until the bellows fills and actuates a switch 100 to break electrical contact between the electrode 71 and the electrode 73 under certain conditions of operation (when the engine is shut off as will be described in greater detail below).

A float operated check valve 105 is located in the conduit electrode 73 for shutting off flow of water from the tank 77 to the enclosed container 67 when the level of the liquid 69 in the container 67 rises to a certain high level within the container. This prevents any liquid from being sucked into the opening 85 and into the main cylinders 25 of the engine.

A pressure actuated valve 106 is also located in the conduit 73 and closes at a preselected pressure in the container 67 to permit the level of the liquid 69 to be depressed as shown in FIG. 3A without refilling by the float valve 105.

The liquid 69 is preferably a potassium hydroxide solution or a sodium hydroxide solution for converting the inducted water from the tank 75 to hydrogen and oxygen under the electrolytic action produced by the battery 87, electrodes 71 and 73 and the electrolyte of the potassium hydroxide or sodium hydroxide solution. This type of electrolytic generator is highly efficient and is effective to convert the water to free hydrogen and oxygen with very little or no loss of electrolyte itself and with the minimum consumption of electrical energy from the battery 87.

In the preferred embodiment of the electrolytic generator 63 a 15% solution of sodium hydroxide and water or a 25% solution of potassium hydroxide and water is used. Since the production, in kilowatt hours, is about 8% greater for potassium hydroxide than it is for sodium hydroxide, potassium hydroxide is the preferred electrolyte solution. However, sodium hydroxide is less expensive than potassium hydroxide and is therefore more commonly used.

Since the details of the electro-chemical conversion itself are well known, such details will not be described further at this point.

In the operation of the system shown in FIGS. 3 and 3A, the intake vacuum produced in the main cylinders 25 acts in conjunction with the atmospheric pressure exerted on the water 77 in the tank 75 to draw the hydrogen and oxygen gas generated in the electrolytic generator 63 through the opening 85 and the conduit 65, inlet manifold 61 and intake conduit 33 to the individual precombustion chambers 29.

In the operation of the FIGS. 3 and 3A embodiment, whatever residual gases remain in the precombustion chamber 29 after the completion of the exhaust stroke of the main piston 15 are drawn into the main combustion chamber 25 on the intake stroke of the piston 15 so that any residual water vapor in the precombustion chamber 29 resulting from combustion of the hydrogen and oxygen in the precombustion chamber is inducted into the main combustion chamber 25 with desirable results. The hydrogen and oxygen then drawn into the precombustion chambers 29 are drawn in as dry gases, and this enhances the clean, efficient combustion in the precombustion chambers 29 as described above.

This also simplifies ignition because the gases are dry.

However, even if any residual water vapor should remain in the precombustion chambers 29, there would be minimal detrimental effect on the forming of the electric spark because the pure water formed is a poor conductor.

The high level check valve 105 prevents the liquid level in the electrolytic generator 67 from rising to the point where the liquid itself can pass into the outlet opening 85, and as a result only the generated hydrogen and oxygen gas mixture can flow to the engine, regardless of any vacuum condition produced in the engine.

The accumulator 99 permits a sufficient amount of liquid 69 to be transferred from the enclosed electrolytic generator 67 to the accumulator 99 on engine shut-down to fill the bellows and to actuate a switch 100. This opens the circuit and stops electrical conductance between the electrodes 71 and 73 to stop generation of hydrogen and oxygen.

When the engine is shut off, the spring forces of the check valves 55 are high enough to accomodate the change in static head of the liquid between that illustrated in FIG. 3 and that illustrated in FIG. 3A so that the pressure of the gases generated in the enclosed container 67 build up sufficiently to force the liquid level down to the position illustrated in FIG. 3A. In this condition of operation the electrical conductance between the electrodes 71 and 73 is broken and no further gas is generated; and the system remains in the condition illustrated in FIG. 3A until the engine has started up again and the intake vacuum is generated in main cylinders 25 to initiate the cycle of operation described above.

This differential between the intake vacuum and the atmospheric pressure in the water tank 75 occurs quickly during the initial cranking of the engine on starting. Since this immediately produces hydrogen and oxygen well within the combustible range, the engine will start immediately (because of the stored hydrogen-oxygen gas mixture which had been previously generated) with very little or no enrichment required by way of choking.

In the FIG. 3 embodiment the hydrogen is mixed with the oxygen in the common conduit 65. The mixed gases will not ignite in this conduit 65 because the flash point of hydrogen under such conditions is about 800° C.

In addition to the hydrogen generated by the cell 63, the hydrogen generated by the automobile battery can also be collected and utilized in the precombustion chambers 29.

The battery 87 for the electrolytic cell 63 can be the same as the existing automobile battery so that the existing automobile generator or alternator and associated voltage regulator can be used to supply the energy needed for the conversion of the water to hydrogen and oxygen.

A conversion unit 88 can also be connected in parallel with the battery 87 as illustrated in FIG. 3. The conversion unit 88 operates off the waste heat in the engine exhaust to convert a part of that waste heat to electricity for supplying the electric power for the electrolytic cell.

Another embodiment of an electrolytic generator 63 is illustrated in FIG. 4. In the FIG. 4 embodiment the electrolytic cell 63 includes an enclosed container 67 which is partially filled with an electrolyte 69. The electrolyte 69 is preferably a potassium hydroxide or sodium hydroxide solution with added water for generating the hydrogen and oxygen gases.

The electrolytic generator includes electrodes 71 and 73 connected with an electrical field produced by a battery 87 in the manner illustrated. Water is added to the container 67 through a conduit 79 and a high level check valve 105 in the same way as illustrated in FIG. 3.

A collector housing 111 extends into the interior of the enclosed container 67 for collecting hydrogen generated around the electrode 73, and the upper end of this collector housing 111 is connected to a conduit 113 which serves as an inlet manifold for the individual conduits 47 for the precombustion chambers 29.

A conduit 115 connects to the interior of the enclosed container 67 for collecting and conducting the generated oxygen, and this conduit 115 serves as an inlet manifold for the individual conduits 49 of the precombustion chambers 29.

The electrode 71 is connected to the positive terminal of the battery 87 through an insulator 117, and the electrode 73 is connected to ground through an insulator 119.

In the operation of the system shown in FIG. 4 the electrolytic cell 67 produces oxygen gas and hydrogen gas around the respective electrodes 71 and 73, and these gases are conducted to the individual precombustion chambers 29.

When the engine is shut off, the check valves 55 and 57 cause the pressure within the housing 11 to build up until the level of the fluid in the housing is forced below the end of the electrode 73 to break the electrical conducting path between the electrodes 71 and 73; and this causes the generation of the oxygen-hydrogen gases to end.

On engine start-up, the difference between the vacuum conditions in the lines 113 and 115 and the super atmospheric pressure existing in the interior of the container 67 (generated at the time of shut-down) immediately raises the level of the liquid within the collector housing 111 to start the electrolytic generation of the hydrogen and oxygen gases. At the same time the stored hydrogen and oxygen gases in the container 67 are sucked into the precombustion chambers 29.

The electrolytic generator 63 shown in FIG. 4 can also be used for the common manifold 61 structure shown in FIG. 3 by adding check valves 121 and 123 as illustrated in FIG. 4 and then joining conduits 113 and 115 in a common manifold before the flame retardant screen 91 of FIG. 3.

While the electrolytic cells shown in FIGS. 3 and 4 have been illustrated as single cells, in practice, the cells are multiple cells which utilize the conventional 12-volt ignition system of existing automobiles with five to six individual cells so that each individual cell operates at its most efficient voltage of 2 to 2½ volts.

It is an important feature of the present invention that while a highly combustible and highly flamable gas is used for the precombustion chamber, the highly combustible gas is used in a way that insures safe operation. In the preferred form of the present invention utilizing hydrogen as the fuel for the combustion chamber, the hydrogen is preferably handled in conduit structure for the oxygen, and the hydrogen is maintained separated from the oxygen at all times up to the actual mixing of the hydrogen and oxygen within the interior of the precombustion chamber itself. This minimizes any danger from leaks or breaks in the fuel conduit structure.

It is another important feature of the present invention that the feed of highly combustible gas is dependent upon producing a vacuum condition so that the difference between the produced vacuum and the existing atmospheric pressure will produce the feed pressure differential. Thus, if there is a line break, the vacuum is lost and feed pressure differential is broken and the worst that could happen is a dilution of air within the gas at the point of the break.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A method of operating an internal combustion engine of the kind in which a fuel is mixed with an oxidant and ignited in a main combustion chamber to produce the power output of the engine, said method comprising, feeding a conventional, primary fuel mixed with an oxidant into a main combustion chamber in an amount sufficient to provide by combustion of the primary fuel all of the power required for operation of the engine and at lean fuel-oxidant ratios for efficient combustion with low emissions, feeding a highly combustible gaseous fuel and a gas containing oxygen into a precombustion chamber, feeding the gaseous fuel to the precombustion chamber in a small amount sufficient only to provide heat and turbulence for ignition of the primary fuel and insufficient to produce any significant amount of useable power in the main combustion chamber, said highly combustible gaseous fuel having a broad enough range of combustibility to permit ignition in the precombustion chamber without the need to provide carburetion of the gaseous fuel with the gas containing oxygen, igniting the gaseous fuel in the precombustion chamber, and then directing the combustion gases from the precombustion chamber into the main combustion chamber to ignite the fuel-oxidant mixture in the main combustion chamber, burning the primary fuel in the main combustion chamber at lean fuel-oxidant ratios to produce efficient combustion with low emissions, and wherein the gaseous fuel is selected from the group comprising hydrogen and carbon monoxide.

2. The invention defined in claim 1 wherein the highly combustible gaseous fuel is free hydrogen.

3. The invention defined in claim 2 including generating free hydrogen and also generating free oxygen and burning the hydrogen with the oxygen in the precombustion chamber to produce water.

4. The invention defined in claim 1 including burning the gaseous fuel in a stoichiometric mixture in the precombustion chamber.

5. The invention defined in claim 1 including conducting the gaseous fuel to the precombustion chamber through a first conduit and conducting an oxygen containing gas to the precombustion chamber through a second conduit and preventing any reverse flow of gases from the precombustion chamber back through said conduits.

6. The invention defined in claim 5 including preventing flash back of the combustion process through conduit structure conveying the highly combustible gas.

7. The invention defined in claim 1 including generating free hydrogen by electrolysis and conducting the generated hydrogen to the precombustion chamber.

8. The invention defined in claim 7 including generating hydrogen and oxygen by reacting water with one of a potassium hydroxide and sodium hydroxide mixture in a cell under the influence of an electric field.

9. The invention defined in claim 7 including generating the hydrogen in an electrolytic cell and stopping the generation of the hydrogen in the electrolytic cell in response to an increase of pressure of the gas generated in the electrolytic cell.

10. The invention defined in claim 7 including generating the free hydrogen by electrolysis in an electrolytic cell which produces hydrogen and oxygen from water and an electrolyte and including automatically adding water to the cell as the water is consumed in the conversion to oxygen and hydrogen.

11. The invention defined in claim 1 including producing shock waves in the gases of the combustion process as the gases from combustion process are directed from the precombustion chamber into the main combustion chamber to provide a plurality of distributed, high temperature ignition points throughout the main combustion chamber.

12. The invention defined in claim 11 wherein the shock waves are produced by an ultrasonic chamber associated with the precombustion chamber.

13. The invention defined in claim 1 including introducing cooling and dilutant air into the precombustion chamber to maintain the temperature of the precombustion chamber below the lower ignition level of the fuel and oxidant mixture in the precombustion chamber, and initiating ignition in the precombustion chamber by an electric ignition device.

14. An internal combustion engine comprising a main combustion chamber, primary fuel supply means for supplying a primary fuel-oxidant mixture to the main combustion chamber in an amount sufficient to produce by combustion of the primary fuel all of the power required for operation of the engine and at lean fuel-oxidant ratios for efficient combustion with low emissions, and precombustion chamber means for feeding a gaseous fuel to a precombustion chamber and for igniting the gaseous fuel in the precombustion chamber and for directing the gases from the combustion process from the precombustion chamber into the main combustion chamber to ignite the fuel-oxidant mixture in the main combustion chamber, and including electrolytic generator means for generating free hydrogen and free oxygen and conduit means for conducting the generated free hydrogen and free oxygen to the precombustion chamber and wherein the electrolytic generator means are constructed to generate the free hydrogen in a small amount sufficient only to provide heat and turbulence for ignition of the primary fuel and insufficient to produce any significant amount of useable power in the main combustion chamber.

15. The invention defined in claim 14 including check valve means in the conduit means for preventing a reverse flow of gases from the precombustion chamber back through said conduits.

16. The invention defined in claim 14 including flame screen means for preventing flashback of the combustion process through the conduit means.

17. The invention defined in claim 14 wherein the electrolytic generator means comprise a cell for reacting water with one of a potassium hydroxide and sodium hydroxide mixture between electrodes under the influence of an electric field.

18. The invention defined in claim 14 including shock wave means for producing shock waves in the combustion gases as the combustion gases are directed from the combustion chamber into the main combustion chamber to provide a plurality of distributed, high temperature ignition points throughout the main combustion chamber.

19. The invention defined in claim 18 wherein the stock wave means include an ultrasonic chamber associated with the precombustion chamber.

20. The invention defined in claim 14 including cooling means for introducing cooling and dilutant air into the precombustion chamber to maintain the temperature of the precombustion chamber below the lower ignition level of the fuel and oxidant mixture in the precombustion chamber and including electric spark means for initiating ignition in the precombustion chamber by an electric ignition device.

21. A method of operating an internal combustion engine of the kind having an induction cycle and in which a fuel is mixed with an oxidant and ignited in a main combustion chamber to produce the power output of the engine, said method comprising:
    drawing in a conventional, primary fuel mixed with an oxidant into a main combustion chamber througout the induction cycle in an amount sufficient to provide by combustion of the primary fuel all of the power required for operation of the engine and at lean fuel-oxidant ratios for efficient combustion with low emissions,
    drawing in throughout the induction cycle a highly combustible gaseous fuel selected from the group consisting of hydrogen and carbon monoxide, and a gas containing oxygen into a precombustion chamber,
    feeding the gaseous fuel to the precombustion chamber in a small amount sufficient only to provide heat and turbulence for ignition of the primary fuel and insufficient to produce any significant amount of useable power in the main combustion chamber, said highly combustible gaseous fuel having a broad enough range of combustibility to permit ignition in the precombustion chamber without the need to provide carburetion of the gaseous fuel with the gas containing oxygen,
    igniting the gaseous fuel in the precombustion chamber,
    then directing the combustion gases from the precombustion chamber into the main combustion chamber to ignite the fuel-oxidant mixture in the main combustion chamber, and
    burning the primary fuel in the main combustion chamber at lean fuel-oxidant ratios to produce efficient combustion with low emissions.

22. A method of operating an internal combustion engine of the kind in which a fuel is mixed with an oxidant and ignited in a main combustion chamber to produce the power output of the engine, said method comprising:
    feeding an oxidant and a conventional, primary fuel into a main combustion chamber in amounts sufficient to provide by combustion of the primary fuel all of the power required for operation of the engine and at lean fuel-oxidant ratios for efficient combustion with low emissions,
    feeding at a pressure not substantially greater than atmosphere, a highly combustible gaseous fuel selected from the group consisting of hydrogen and carbon monoxide, and a gas containing oxygen into a precombustion chamber,
    feeding the gaseous fuel to the precombustion chamber in a small amount sufficient only to provide heat and turbulence for ignition of the primary fuel and insufficient to produce any significant amount of useable power in the main combustion chamber, said highly combustible gaseous fuel having a broad enough range of combustibility to permit ignition in the precombustion chamber without the need to provide carburetion of the gaseous fuel with the gas containing oxygen,
    igniting the gaseous fuel in the precombustion chamber,
    then directing the combustion gases from the precombustion chamber into the main combustion chamber to ignite the fuel and oxidant in the main combustion chamber, and
    burning the primary fuel in the main combustion chamber at lean fuel-oxidant ratios to produce efficient combustion with low emissions.

23. An internal combustion engine comprising:
    a main combustion chamber,
    primary fuel supply means for supplying a primary fuel-oxidant mixture to the main combustion chamber in an amount sufficient to produce by combustion of the primary fuel all of the power required for operation of the engine and at lean fuel-oxidant ratios for efficient combustion with low emissions,
    a precombustion chamber,
    means for feeding, at a pressure not substantially greater than atmospheric, a gaseous fuel to a precombustion chamber,
    means for igniting the gaseous fuel in the precombustion chamber,
    means for directing the gases from the combustion process from the precombustion chamber into the main combustion chamber to ignite the fuel-oxidant mixture in the main combustion chamber,
    electrolytic generator means for generating free hydrogen and free oxygen,
    conduit means for conducting the generated free hydrogen and free oxygen to the precombustion chamber via said means for feeding,
    said electrolytic generator means being constructed to generate the free hydrogen in a small amount sufficient only to provide heat and turbulence for ignition of the primary fuel and insufficient to produce any significant amount of useable power in the main combustion chamber.

* * * * *